Figure 1:
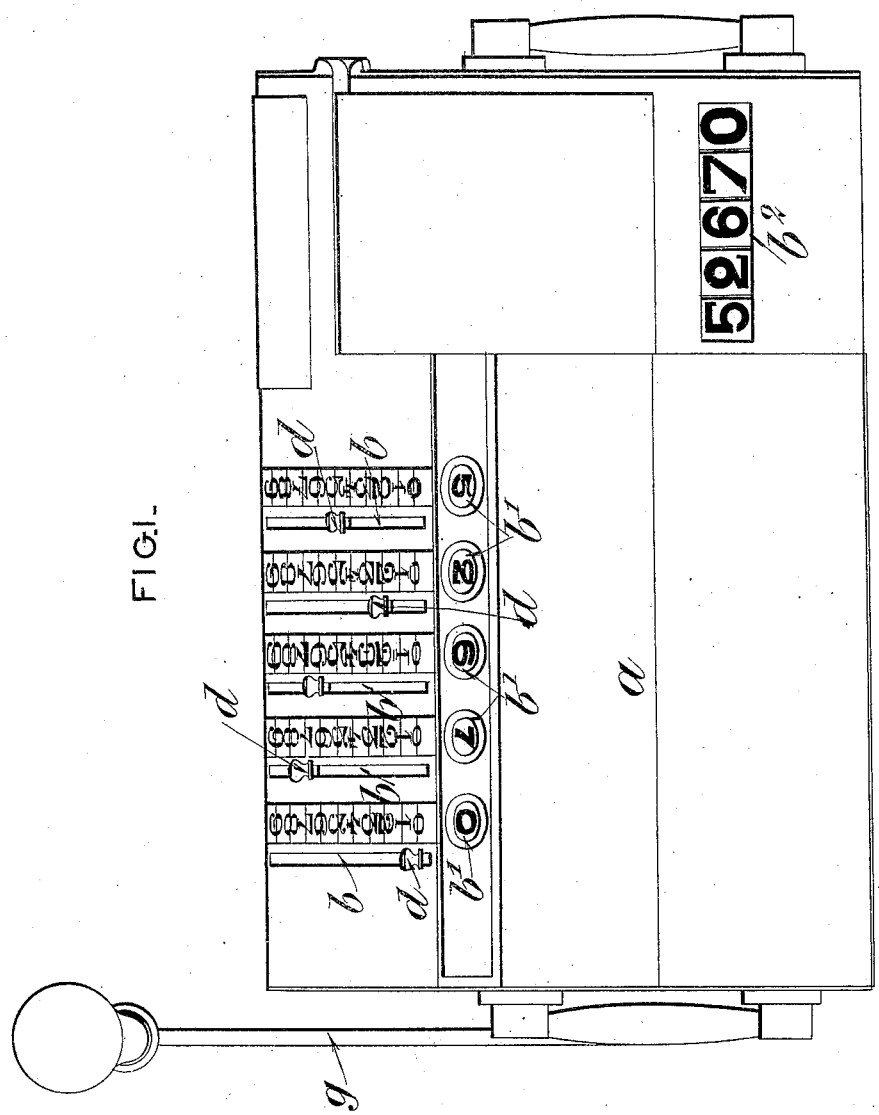

(No Model.) 14 Sheets—Sheet 1.

H. POTTIN.
CASH REGISTER AND RECORDER.

No. 575,372. Patented Jan. 19, 1897.

Witnesses.
Severance
C. A. Muzzy

Inventor
Henry Pottin
by W. H. Babcock
Attorney (No Model.)
14 Sheets—Sheet 2.
H. POTTIN.
CASH REGISTER AND RECORDER.
No. 575,372.
Patented Jan. 19, 1897.
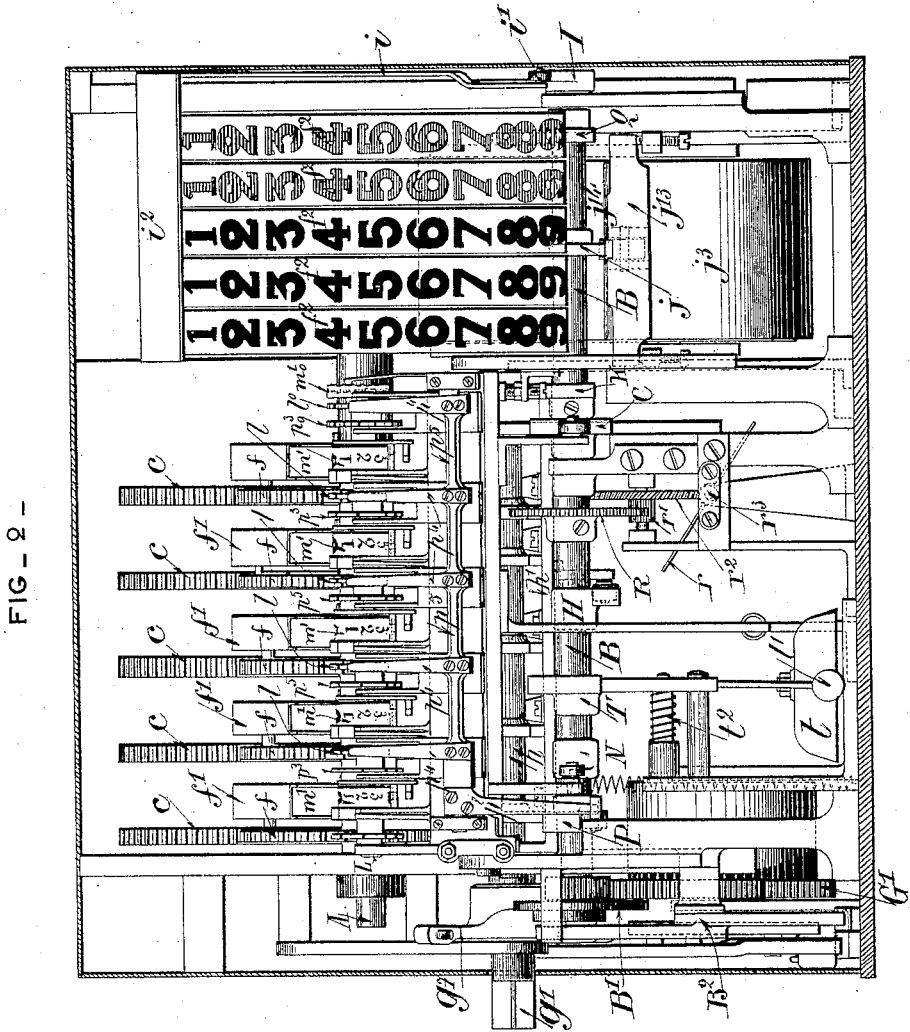
FIG_2_
Witnesses.
Inventor
Henry Pottin
by Wm H Babcock
Attorney (No Model.) 14 Sheets—Sheet 3.
H. POTTIN.
CASH REGISTER AND RECORDER.
No. 575,372. Patented Jan. 19, 1897.
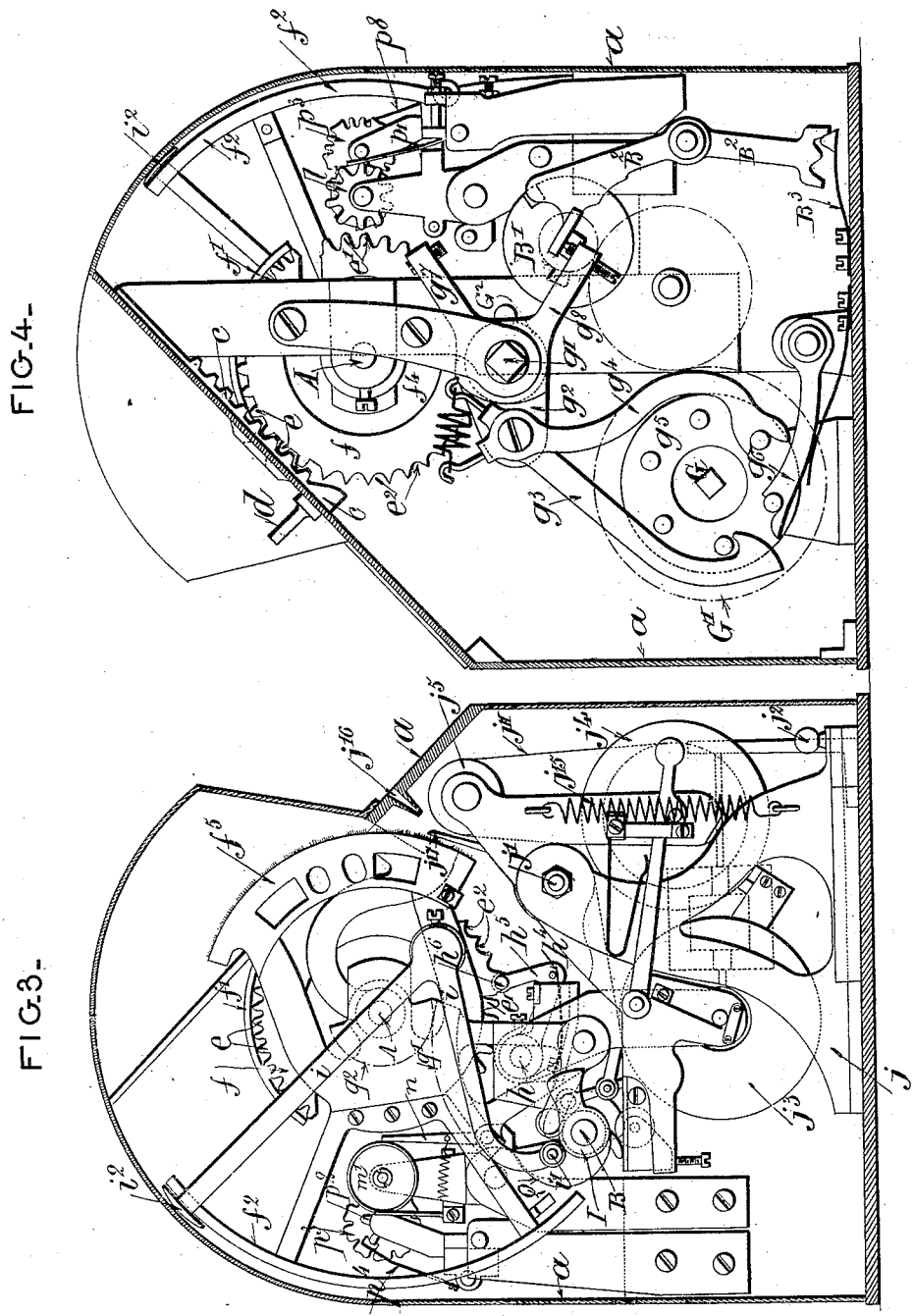
Witnesses.
Severance
C. A. Murphy
Inventor
Henry Pottin
by Wm H Babcock
Attorney (No Model.) 14 Sheets—Sheet 4.

H. POTTIN.
CASH REGISTER AND RECORDER.

No. 575,372. Patented Jan. 19, 1897.

Witnesses

Inventor
Henry Pottin
by Wm H Balcock
Attorney (No Model.) 14 Sheets—Sheet 5.

H. POTTIN.
CASH REGISTER AND RECORDER.

No. 575,372. Patented Jan. 19, 1897.

Witnesses
Severance

Inventor
Henry Pottin
by W. H. Babcock
Attorney (No Model.) 14 Sheets—Sheet 6.

H. POTTIN.
CASH REGISTER AND RECORDER.

No. 575,372. Patented Jan. 19, 1897.

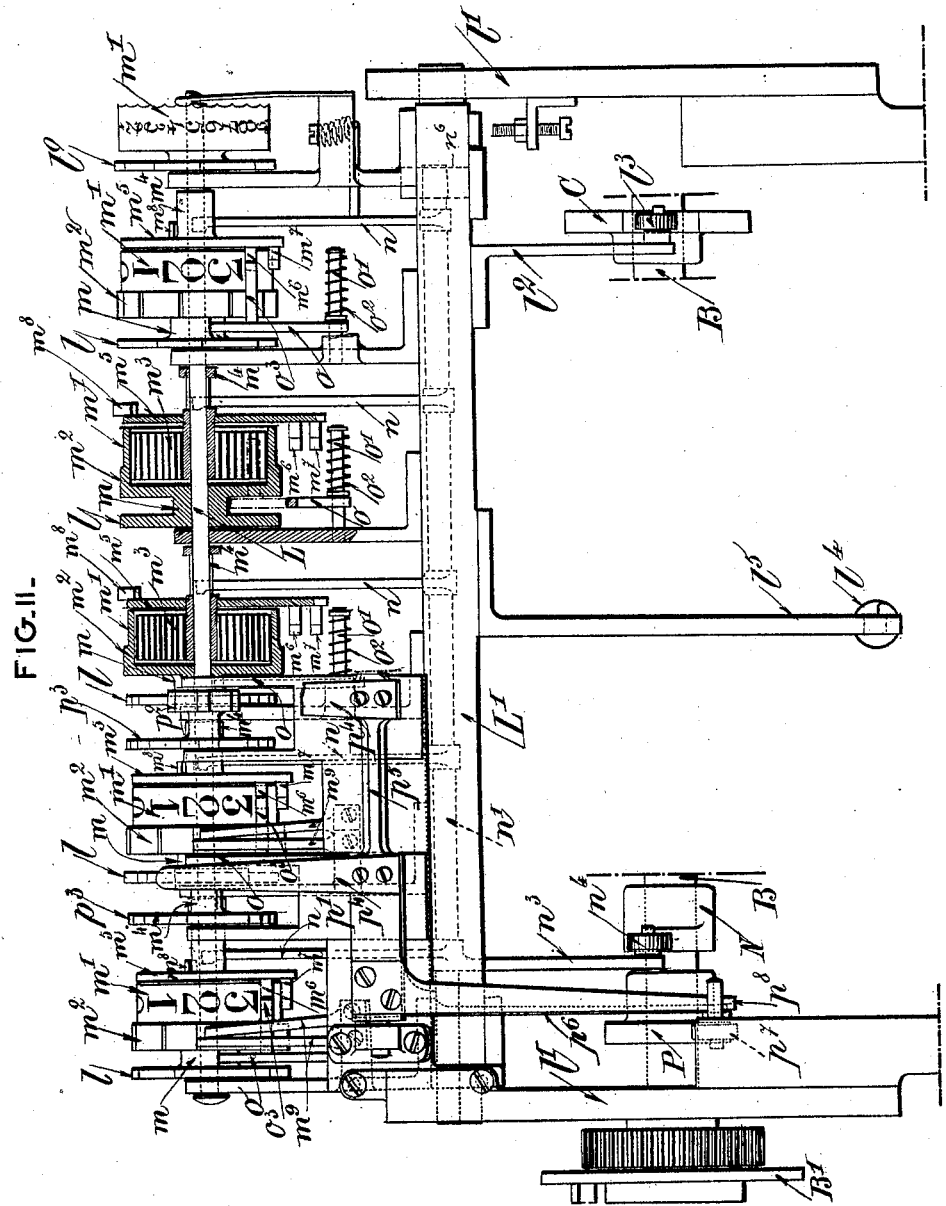

(No Model.) 14 Sheets—Sheet 8.

H. POTTIN.
CASH REGISTER AND RECORDER.

No. 575,372. Patented Jan. 19, 1897.

Witnesses.
Severance
C. A. Muzzy

Inventor
Henry Pottin
by Wm H Babcock
Attorney

THE NORRIS PETERS CO., PHOTO-LITHO., WASHINGTON, D. C.

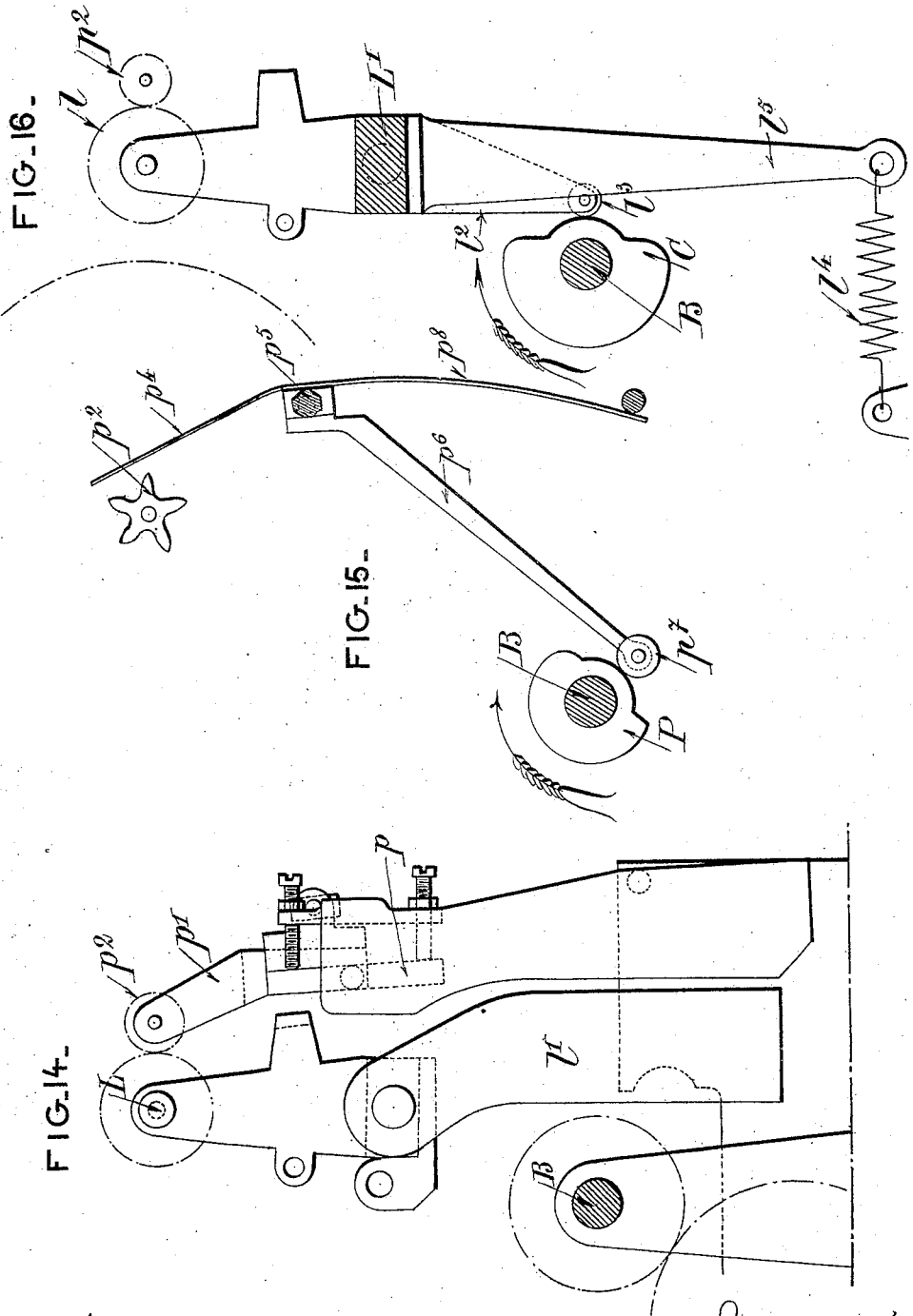

(No Model.) 14 Sheets—Sheet 10.
H. POTTIN.
CASH REGISTER AND RECORDER.
No. 575,372. Patented Jan. 19, 1897.
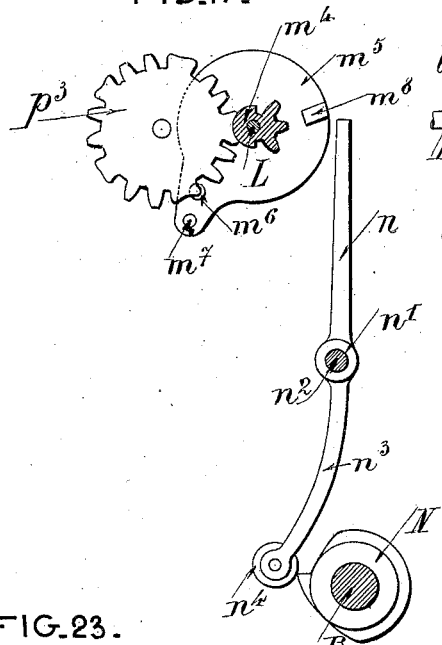
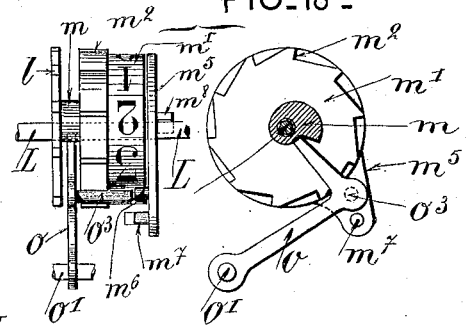
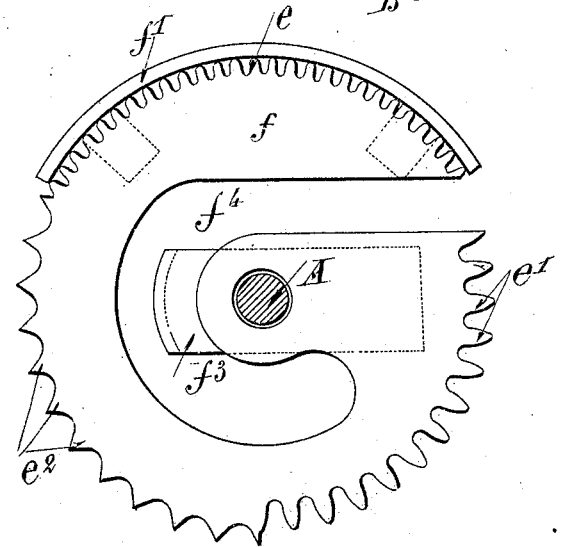
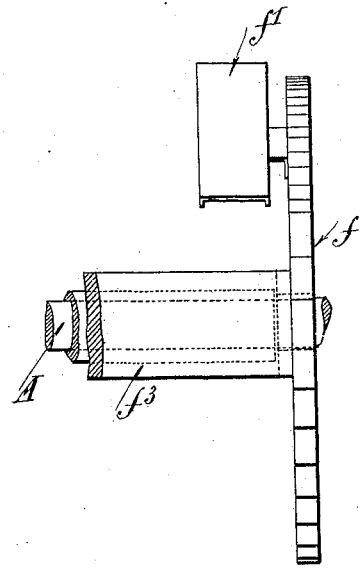
Witnesses.
Severance
C. A. Muzzy
Inventor,
Henry Pottin
by W H Babcock
Attorney (No Model.) 14 Sheets—Sheet 11.
H. POTTIN.
CASH REGISTER AND RECORDER.
No. 575,372. Patented Jan. 19, 1897.
FIG_21_  FIG_19_ 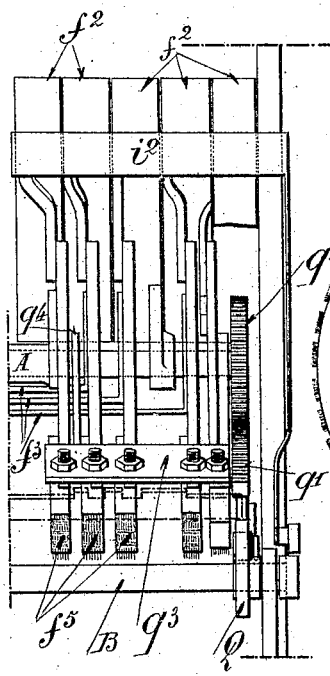 FIG_20_ 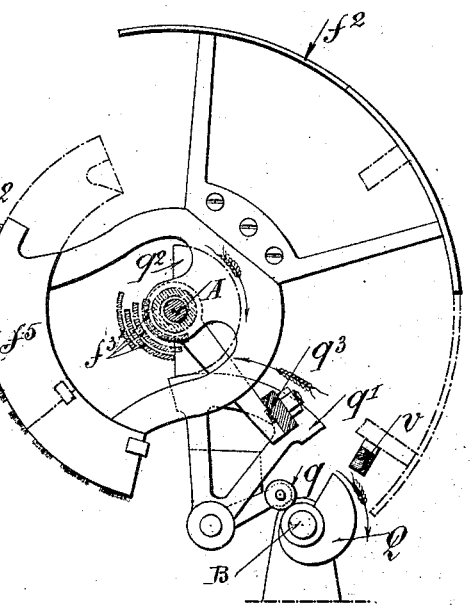
FIG_22_
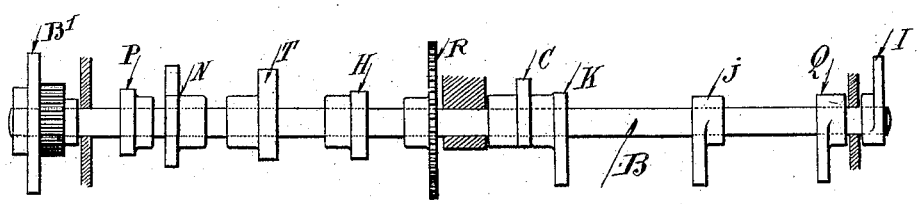

(No Model.)  14 Sheets—Sheet 12.
H. POTTIN.
CASH REGISTER AND RECORDER.
No. 575,372. Patented Jan. 19, 1897.

Witnesses. Inventor
Severance. Henry Pottin
C. A. _____ by Wm H Babcock
 Attorney (No Model.) 14 Sheets—Sheet 13.

H. POTTIN.
CASH REGISTER AND RECORDER.

No. 575,372. Patented Jan. 19, 1897.

Witnesses
Inventor
Henry Pottin
by Wm H Babcock
Attorney (No Model.) 14 Sheets—Sheet 14.

H. POTTIN.
CASH REGISTER AND RECORDER.

No. 575,372. Patented Jan. 19, 1897.

Witnesses:
Alex Scott
Au Jong

Inventor:
Henry Pottin
by Wm H Babcock
Attorney

UNITED STATES PATENT OFFICE.

HENRY POTTIN, OF PARIS, FRANCE.

CASH REGISTER AND RECORDER.

SPECIFICATION forming part of Letters Patent No. 575,372, dated January 19, 1897.

Application filed February 4, 1896. Serial No. 578,003. (No model.) Patented in France May 31, 1893, No. 230,494.

*To all whom it may concern:*

Be it known that I, HENRY POTTIN, a citizen of the Republic of France, residing at Paris, France, have invented certain new and useful Improvements in Cash-Registers; and I do hereby declare the following to be a full, clear, and exact description of the invention, such as will enable others skilled in the art to which it appertains to make and use the same.

The object of this invention is to increase the efficiency of cash registers and recorders.

The said invention consists in the construction and combination of the various parts of the same, as hereinafter more particularly set forth and claimed.

The said invention has been patented in France by Letters Patent dated May 31, 1893, No. 230,494.

Figure 5:
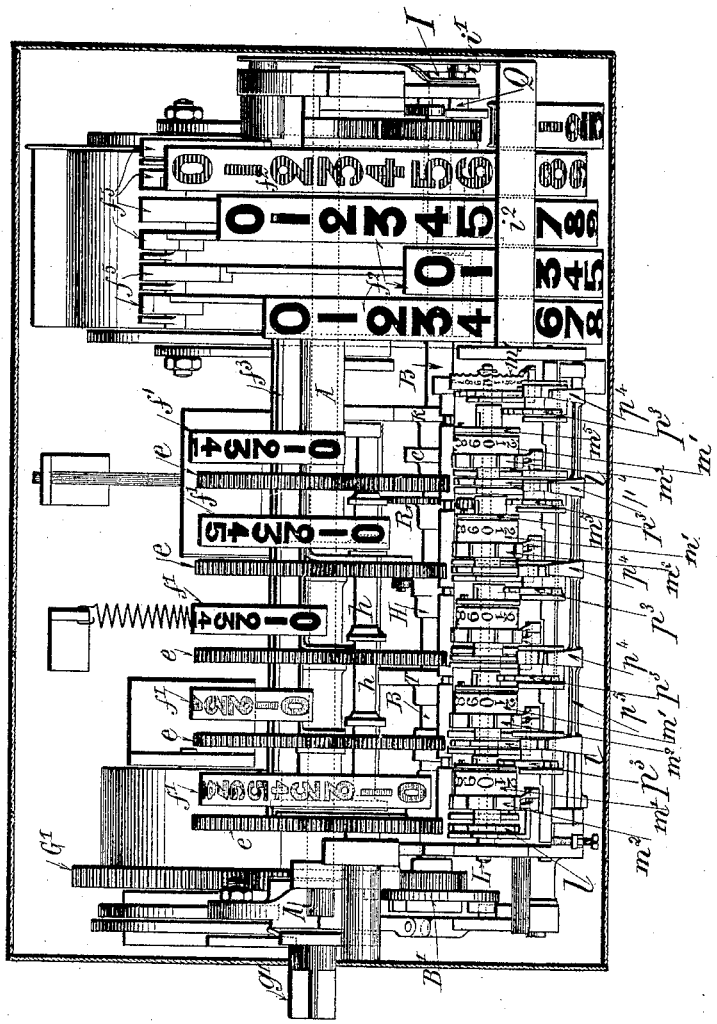
Figure 6:
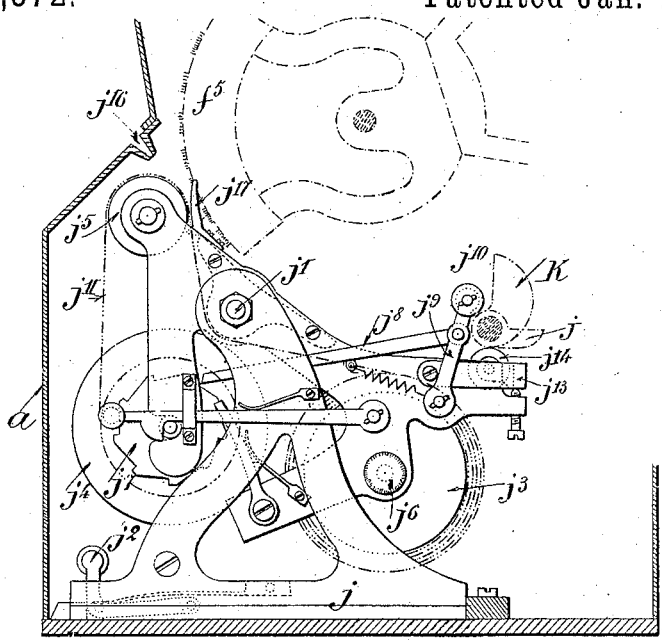
Figure 7:
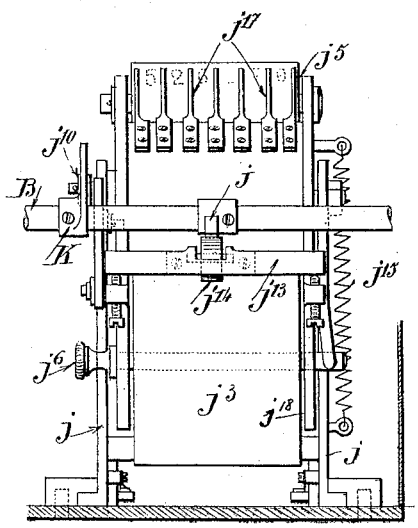
Figure 8:
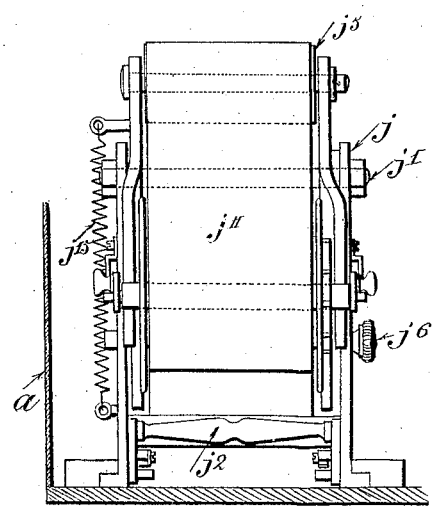
Figure 10:
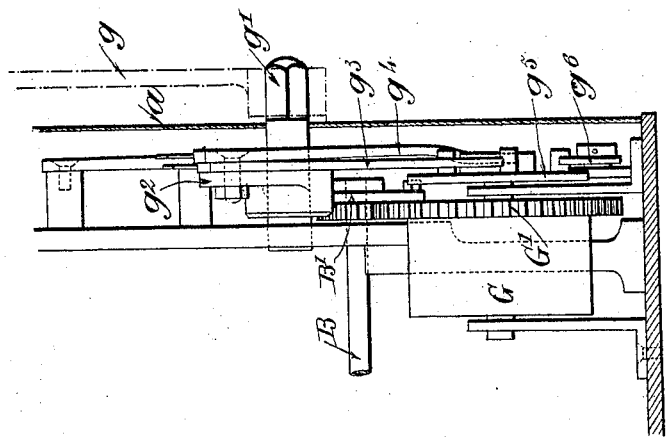
Figure 9:
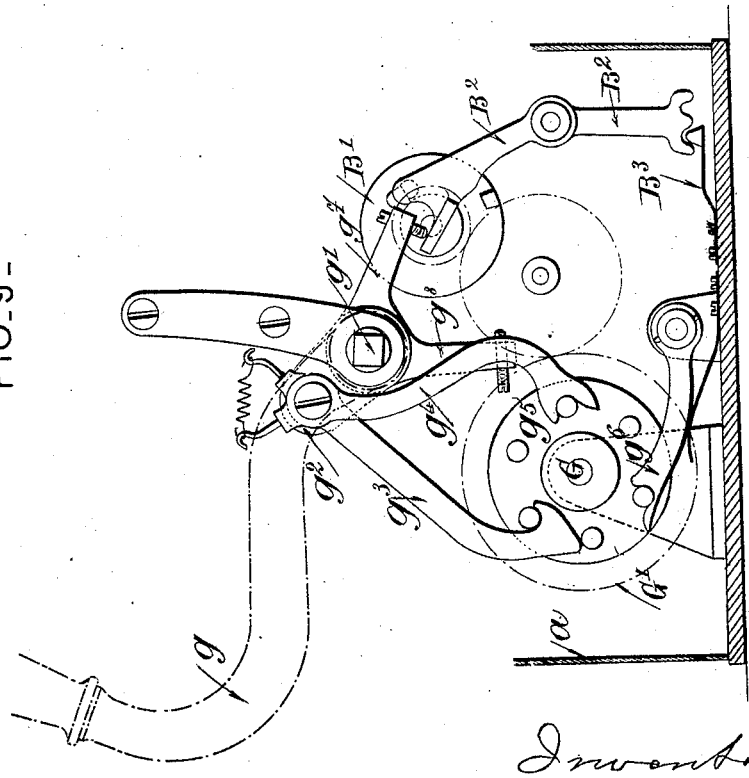
Figure 31:
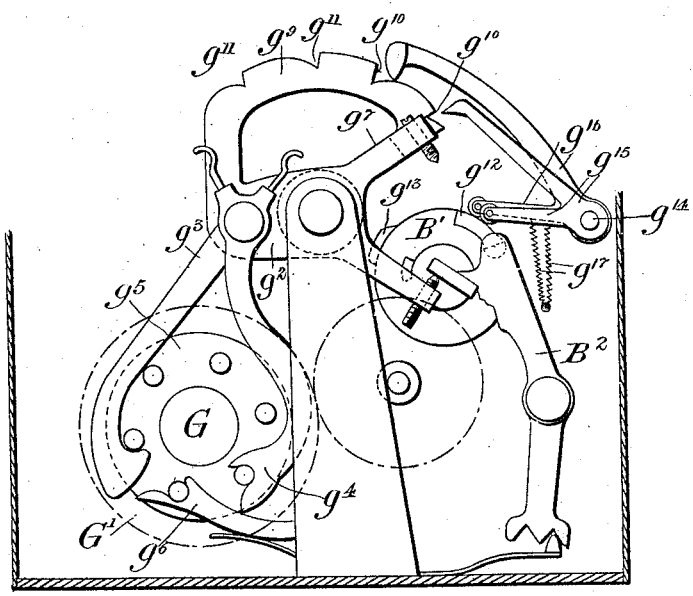

In the accompanying drawings, Figure 1 represents an external plan view of the machine. Fig. 2 represents an elevation of the same on the customer's side, the outer casing being removed. Figs. 3 and 4 represent two vertical sections at opposite ends of the mechanism, taken just inside the casing. Fig. 5 represents a view similar to Fig. 1, but with the outer casing horizontally cut away. Figs. 6, 7, and 8 represent elevations, taken from three different sides, of the recording and stamping mechanism detached, Fig. 6 also showing the casing in vertical section. Figs. 9 to 30 represent detail views of the various parts of the mechanism; and Fig. 31 represents an auxiliary safety device applied to and combined with the manipulating-lever, the operative parts being shown in side elevation and the casing in vertical section.

In the said drawings, $a$ designates the main casing of the machine, which forms, as usual, a desk on the side toward the cashier. It is provided with guide-slots $b$, Fig. 1, for the ordinary sliding pusher-buttons $d$, to which rack-bars $c$ are attached, these last being arranged under the inclined part of the casing, Figs. 2 and 4. The said rack-bars gear, respectively, with the teeth $e$ of disks $f$, arranged in corresponding series. These disks are independent of each other and loosely mounted on a common shaft A, Figs. 2, 3, 4, 23, and 24. Each disk $f$ has a graduated indicating-segment $f'$ attached to it. These segments are arranged so that the numerals "0" to "9" thereon will be visible through windows $b'$ in the inclined part of the casing. The cashier on receiving a sum of money slides down the pusher-buttons in their slots and stops each when the right figure appears at the window to indicate the sum received. As illustrated, the mechanism can register receipts up to nine hundred and ninety-nine francs and ninety-five centimes, French money, and the totalizer can add them up to nineteen thousand, nine hundred and ninety-nine francs and ninety-five centimes. On the said shaft A are also mounted a series of loose indicating-segments $f^2$, each of which is connected to one of the said disks by a bar $f^3$, the first disk on the left being thus connected to the first segment on the right, the second disk on the left to the second segment on the right, and so on. Where the bars $f^3$ must pass through intervening disks, the latter are provided with arc-shaped slots $f^4$, which allow the motion of said disks and bars independently about the said shaft without obstructive contact, Figs. 5, 19, 20, 23, and 24. The short bar $f^3$, connecting the innermost disk $f$ and segment $f^2$, of course does not pass through any disk.

The above system of connections insures the exhibition by segments $f^2$, through the windows $b^2$ in the customer's side of the casing, of the same numerals that simultaneously appear, as aforesaid, through the windows $b'$ on the cashier's side. A third series of segments $f^5$, Figs. 3, 19, and 20, respectively, integral or rigid with segments $f^2$, bear in each instance, like the other two series, peripheral numerals from "0" to "9," but these are embossed so as to be available for stamping and recording. In each instance the same sum will be recorded by segments $f^5$, which will be exhibited simultaneously to the customer and cashier through the said two sets of windows.

Each of the disks $f$ has three series of gear-teeth $e$, (already described,) $e'$, and $e^2$. The teeth $e'$ operate the totalizer. The teeth $e^2$, with abutment-pieces, hereinafter described, keep the disks from turning while stamping goes on. They also prevent the cashier from changing the sum shown before operating the totalizer.

All the mechanism is driven by a spring-drum G, the arbor of which is provided with a stud-plate $g^5$, arranged to be engaged by a pivoted pawl $g^3$ when a lever-arm $g^2$ rocks in one direction and by a pivoted pawl $g^4$, also on the end of the said arm, when the latter rocks in the other direction. In either case the arbor is turned in the same direction, that which applies tension to the said spring, by reason of the arrangement of the said pawls and of the studs on the said plate. The said arm $g^2$ belongs to a three-armed lever $G^2$, Figs. 4, 9, and 10, and this is mounted with and moves with an operating-lever $g$. Therefore, whether the latter moves up or down, each motion of it winds the spring. A detent $g^6$ prevents the said arbor from turning back.

The spring-drum G carries a crown-wheel G', which always, by intervening connections, tends to drive the main shaft B, on which nine cams, hereinafter described, are mounted; but such rotation takes place only at the proper time and to the required extent by reason of the special construction and arrangement of the connecting devices. At one end of the shaft B and on the same side of the machine as the lever $g$ a cam B' is mounted, having lateral studs formed thereon, with which a locking double lever $B^2$, under pressure of spring $B^3$, normally engages. The lever $G^2$ has arms $g^7 g^8$ beside the arm already described. One of these two acts on the upper end of locking-lever $B^2$ when the operating-lever $g$ moves upward, and the other one of the said arms does the same when the operating-lever moves downward, in either case removing lever $B^2$ from contact with one of the studs of the said stud-plate and allowing the said spring-drum to turn until the said lever $B^2$ presents its upper end under the other stud of this plate. As the two studs of the said plate B' are placed at right angles to each other the rotary motion is through one-fourth of a circle when the handle is moved in one direction and through three-fourths of a circle in the other. When the driving-shaft B is thus caused to turn one-fourth of a revolution, a cam H on the said shaft acts on an antifriction-roller $h^3$, carried by a pivoted frame $h'$, to block the disk $f$. The said frame is provided with a spring or springs $h^2$ for holding the said roller against the said cam; also with flat springs $h^4$, the free outer ends of which bear upward against the studs $h^7$ on angular arms $h^5$, so as to hold the locking-rollers $h^6$ on the upper ends of the said arms, Figs. 27 and 28, with a resilient pressure in the spaces between the teeth $e^2$ and against the said teeth. When the said cam is not in position to act on the roller $h^3$ with this locking effect, the rollers $h^6$ fall out of such engagement with the said teeth and free the disks $f$. The frame $h'$ and arms $h^5$ are mounted, as shown, on a shaft $h$, parallel to shaft B, but obliquely above the same.

The period of three-fourths of a rotation of the driving-shaft during which the rollers $h^6$ are freed from locking engagement with the teeth $n'$, as aforesaid, is advantageously divided into two periods, respectively, of a half-rotation and a quarter-rotation. During the former of these periods the rollers $h^6$ are not between the teeth $n'$, but very lightly in contact with them. During the latter of these periods the said rollers are held in between the teeth, not with such force as to lock the disks $f$ against rotation, but so as to be in position for instantly effective locking action when forced farther in at the end of the first indicating operation which exhibits the amount of the individual payment through windows $i$ and $j$. To this end the cam H is provided with three peripheral cam-faces 1, 2, and 3 of different radius. When the roller $h^3$ is in contact with the cam-face 1, which is that of greatest radius and one-fourth of a circle in extent, the disks $f$ are locked. When the said roller is in contact with the cam-face 2, which is of the least radius and one-half of a circle in extent, the rollers $h^6$ are entirely out from between the teeth $n'$ of the said disks, and when the said roller $h^3$ is in contact with the cam-face 3, of intermediate radius and a fourth of a circle in extent, the said rollers $h^6$ are held lightly between the teeth $n'$ of the said disks, but ride lightly over them as the said disks turn, the springs $h^4$ yielding to allow this action. Simultaneously with this locking action another cam I on the said shaft B acts on a roller $i'$ at the end of one of the arms of a bell-crank lever $i$ and thereby moves the shutter $i^2$ on the other arm of the said lever, so as to uncover the window $b^2$ toward the customer, Figs. 3 and 21.

The recording and stamping mechanism, Figs. 2, 3, 6, 7, and 8, comprises two standards $j$, supporting suitable bearings for the shaft $j'$, opposite a locked door. The recording mechanism all vibrates on or around this shaft and is removable therewith at will. It is supported and guided by two slides, by a cross-bar on the customer's side and by studs on the cashier's side. A jointed handle $j^2$ bears against these studs, being held down by springs. By turning up this handle and pulling it outward the cashier can remove the recording mechanism from the casing in order to replace the roll of paper. On this shaft $j$ is mounted a frame provided with the bearings of the spindles of the paper-rolls $j^3$ and $j^4$ and of the rubber-faced roller $j^5$. The spindle of paper-roll $j^3$ is provided with a button $j^6$ at one end for convenience in withdrawing the said spindle when a new roll of paper is to be supplied. The said roll, while in use, is free to turn on the said spindle. This is the winding or supply roll. The unwinding or storage roll $j^4$ may be removed after lifting the ends of the levers $j^{12}$ or spring-bars which hold the ends of the shaft in their bearings. One of the ends of the roll $j^4$ is provided with a ratchet-wheel $j^7$, actuated by a pawl $j^8$, pivoted on a lever $j^9$. This lever is hinged at one end to the removable frame of the recording mechanism, and carries at the other end a roller $j^{10}$, which is intermittently acted on by cam K of driving-shaft B, this action taking place when the lever $g$ has reached its lowest position. At this moment the stamping is complete, and the roll $j^4$ turns far enough to present a fresh part of the paper web $j^{11}$ against the rubber face of the bed-roll $j^5$, on which the stamping is done. The said ratchet-wheel is provided with a retaining-pawl.

In order to record the sum received, it is only necessary to move the printing-roller $j^5$ against the embossed segments $f^5$, the web of paper being between. This is done by means of cam $j$ on the driving-shaft B acting on a roller $j^{14}$ carried by a support $j^{13}$, which is adjustably attached to the frame of the registering mechanism, said frame being mounted on shaft $j'$, so as to vibrate thereon. In such vibratory motion the roller $j^5$ presses the paper against the embossed figures on the segments $f^5$, which print on the paper the sum shown at the windows of the desk or casing, as before described. The frame carrying the said roller $j^5$ and the paper-rolls will be returned to its first position by a replacing-spring $j^{15}$ when the cam $j$ ceases to operate on the roller $j^{14}$. A flat brake-spring $j^{18}$ bears on the spindle of roller $j^3$ to prevent too rapid unwinding of the paper. The same embossed figures of the segments $f^5$ may also be stamped on a bill to show payment. The cashier, when beginning to operate the lever, inserts the bill through a slot $j^{16}$ in the casing, Figs. 3 and 6, and between the guide-webs $j^{17}$ and the embossed disks $j^5$. These guide-webs then remove the bill from the raised figures which have stamped it.

In the totalizing mechanism there are five pinions $l$, having ten teeth each, adapted to gear with the teeth $e'$ of the disks $f$, being, respectively, in the same vertical planes, Figs. 2, 4, 5, 11, 12, and 13. These pinions and a supplemental pinion $l^0$, which has no corresponding disk $f$, are mounted loosely on a shaft L, parallel with the driving-shaft B. This shaft L turns in bearings, which are rigid with a rock-shaft L', that has also a rigid arm $l^2$, carrying at its end a roller $l^3$, intermittently acted on by cam C of shaft B when the operating-lever $g$ is moved into proper position. Simultaneously the rock-shaft L' oscillates so as to bring the pinions into gear with the disks $f$, as aforesaid, Fig. 13. As soon as the cam C moves away from the roller $l^3$, a replacing-spring $l^4$, acting on another arm of the rock-shaft L', turns the latter back to its former position, removing the said pinions from the said disks. Each pinion $l$ is integral with a cam $m$, Figs. 11 and 18, and a spring-drum $m'$, the other end of whose spring $m^3$ is attached to a sleeve carrying a toothed segment $m^4$, the said drum being also provided with a ratchet-wheel $m^2$. Each group formed of a pinion $l$, cam $m$, and spring-drum $m'$ is independent of the others. All are mounted loosely on shaft L. Each support of shaft L has a double flat spring-pawl $m^9$ detachably fastened to it, one of the leaves of the said spring being shorter than the other, to operate as hereinafter set forth. The hub of each segment $m^4$ carries also a disk $m^5$, closing the drum on the side opposite to the cam $m$. An arm projecting from the periphery of said disk carries two fixed studs $m^6$ $m^7$ at different distances from the center of the disk, one of the said studs being also more advanced than the other in the direction of rotation. Said disk is also provided with a stud $m^8$ on the side opposite to that which carries the said spurs. The supplemental pinion $l^0$, which registers thousands, has no cam and only an empty drum $m^{10}$.

Figure 12:
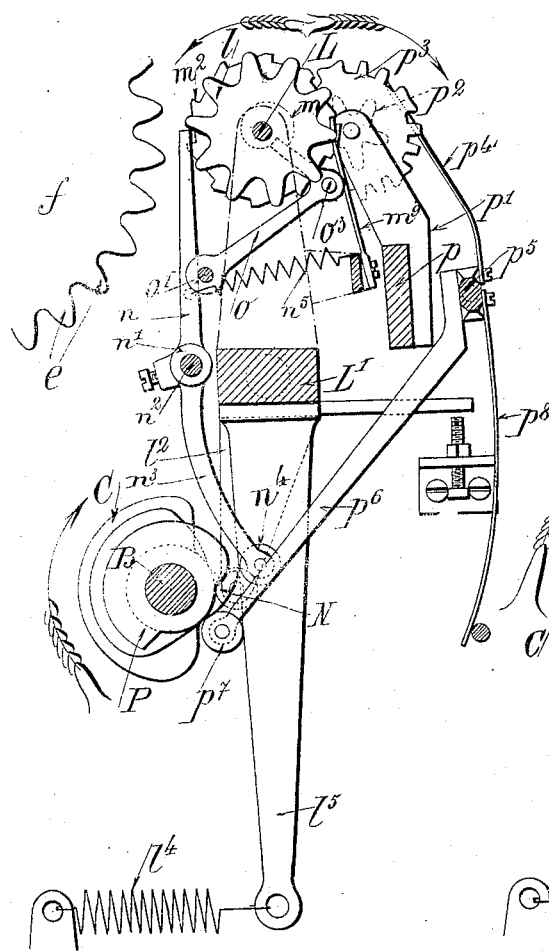
Figure 13:
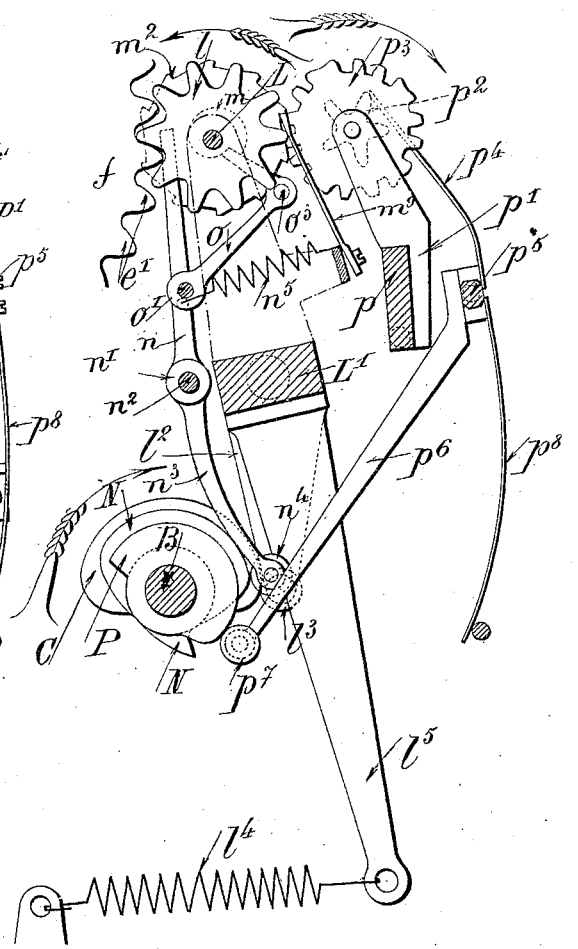
Figure 25:
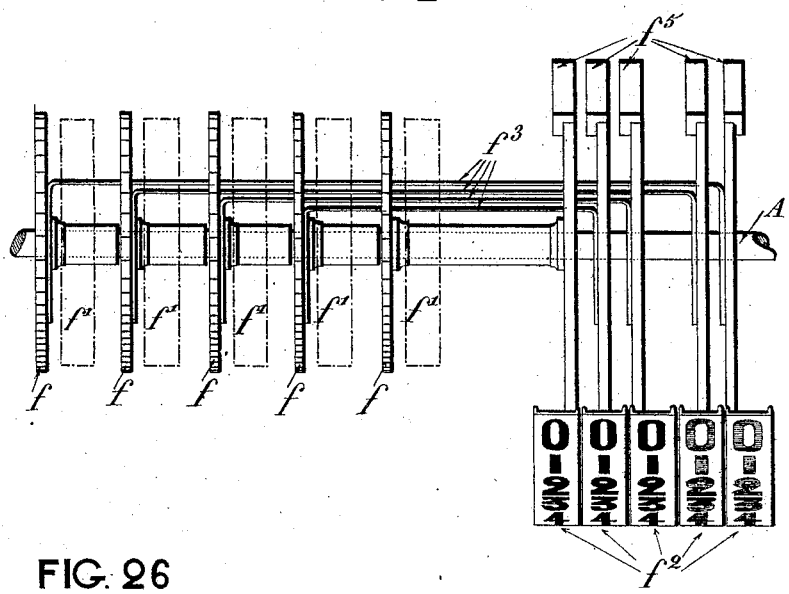
Figure 26:
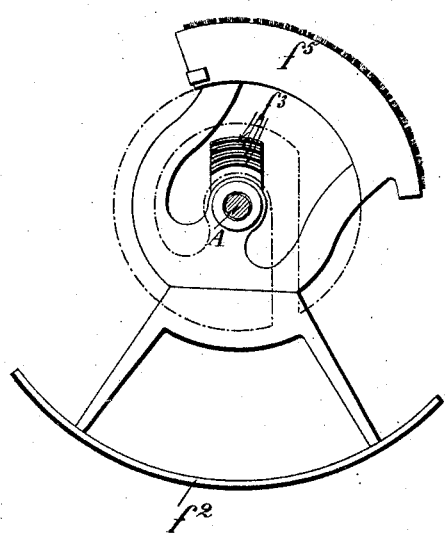
Figure 29:
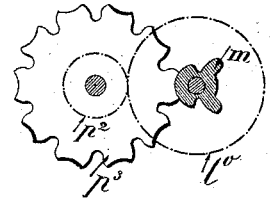
Figure 30:
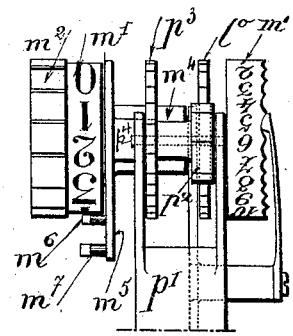
Figure 28:
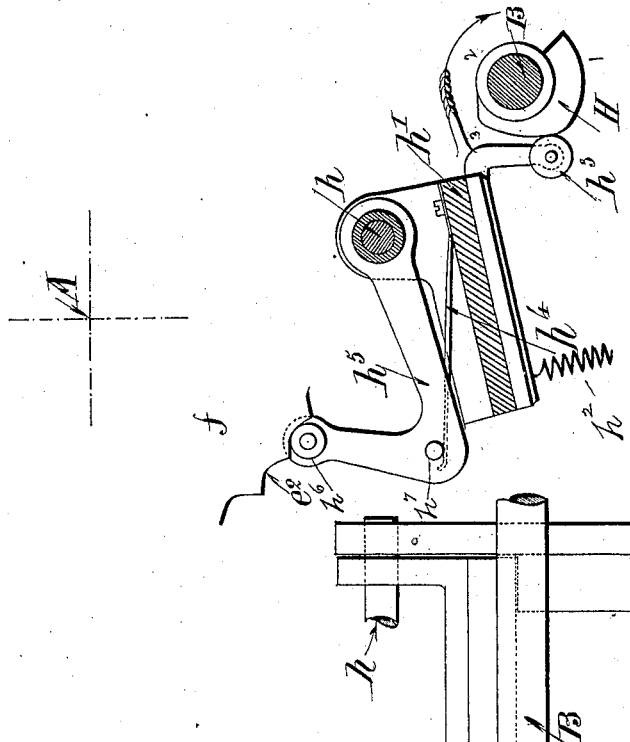
Figure 27:
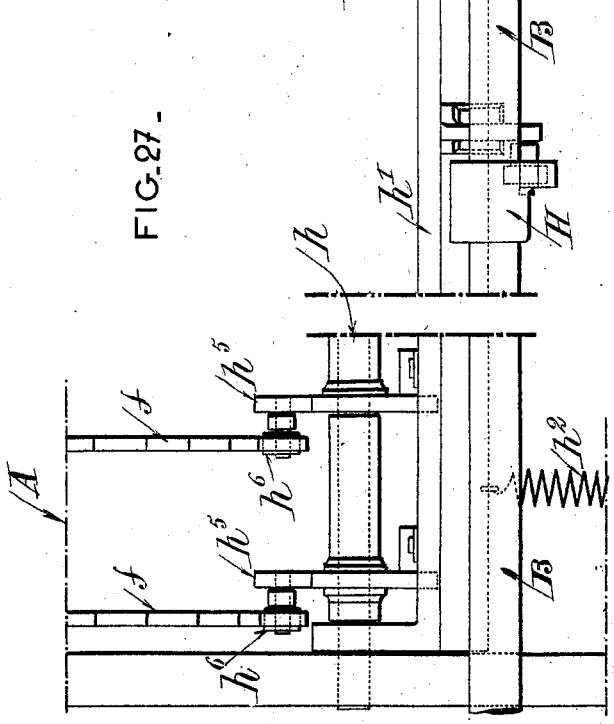

The rock-shaft L', Figs. 11, 12, 13, and 17, has flattened faces permitting the fastening thereto of small brackets $n^6$, which afford bearings for a small shaft $n^2$, provided with a sleeve or hub $n'$, having a series of arms $n$ and an additional arm $n^3$, the latter carrying at its end a roller $n^4$, held in contact by a spring $n^5$ with the cam N, Figs. 12, 13, and 17, on the driving-shaft B. This cam acts on the said roller, when the said shaft is rocked, by lifting the lever $g$, and thereby turns the arms $n$ into position under the studs $m^8$ of the disks $m^5$, respectively, so as to prevent the said disks from turning and keep the springs $m^3$ compressed, Fig. 13. When the operating-lever $g$ is brought down to its lowest position, the segments $l$ have been moved thereby away from the disks $f$ to their position of rest, Figs. 11 and 17, and the arms $n$ release the studs aforesaid. This successive order of release is due to the successively-increasing width of the said studs or striking-pieces in the series of disks. The flattened rock-shaft L' carries also a second set of devices consisting of bell-crank levers $o$, located in the same vertical planes, respectively, as the corresponding cams $m$, Figs. 11 and 18. Each lever $o$ turns on its own pivot-pin $o'$, fixed to one of the supports of the shaft L, and each pivot-pin is surrounded by a helical spring $o^2$, whereby its lever $o$ is forced against the corresponding cam $m$. Each lever $o$ carries a stud $o^3$, arranged for contact, at the proper time, with one of the two spurs $m^6$ $m^7$ aforesaid when their disk $m^5$ is rotated.

A flat bar $p$ is adjustably fastened in front of the pinions $l$. Five brackets $p'$ are fastened on this bar, each forming a pair of supports for the ends of a small spindle, on which, Figs. 11, 12, 13, and 14, a five-toothed wheel $p^2$ and a fifteen-toothed wheel $p^3$ turn side by side. The fifteen teeth of each wheel $p^3$ are divided into five sets of three teeth, each set successively gearing with the segment $m^4$ corresponding to the said wheel. Each of the five-toothed wheels $p^2$ is in the same vertical plane as the corresponding ten-toothed pinion $l$. As already stated, the said pinions $l$ are vibrated collectively in their said vertical planes from one to another extreme positions about shaft L. In one of these positions the decimes-pinion $l$ gears with the centimes five-toothed wheel $p^2$, and so on, as far as the supplemental pinion $l^0$ for thousands of francs, which gears with the hundreds-of-francs five-toothed wheel. In the other position the said pinions $l$ gear with the said pinions $f$, except that the centimes-pinion $f$, the first of the series, does not gear with anything except its actuating rack-bar.

A cam P on the driving-shaft B acts on a roller $p^7$, carried by an arm $p^6$ of a small rock-shaft $p^5$, to hold a series of flat locking-springs $p^5$, also carried by the said shaft, against the wheels $p^2$, respectively, to prevent their rotation when the said wheels $p^2$ are not in gear with the said pinions $l$. As soon as these latter are again moved into such engagement the cam P ceases to act on the roller $p^7$, and the springs $p^4$, moving away from the wheels $p^2$, leave these latter free to turn. A spring $p^8$ at all times bears on the arm $p^6$, holding the roller $p^7$ in position for the action of the said cam.

When the lever $g$ is raised into its highest position, the mechanism above described is ready for totalizing, the pinions $l$ being in gear with the disks $f$, the arms $n$ under the studs $m^8$, and one of the spurs $m^6$ or $m^7$ in each pair against the corresponding stud $o^5$ of the lever $o$, while the flat springs $p^4$, as above stated, lock the five-toothed wheels $p^2$ and the fifteen-toothed wheels $p^3$. The lever $g$ is now brought down. A cam Q on the shaft B, Figs. 19 and 20, rocked thereby, acts on a roller $q$, integral with a toothed segment $q'$, which is loosely mounted on a fixed rod and engages and turns a similar segment $q^2$, loose on the shaft A, this latter segment carrying a bar $q^3$, parallel to the said shaft, this bar being also partly supported by an arm $q^4$ on the said shaft. This bar $q^3$ is thus brought against the heels of the segments $f^5$ and turns the latter, as well as the segments $f^2$ and disks $f$, back to zero, the arms of the segments $f^2$ all resting on a stop-bar $v$ when the movement is complete. Each disk $f$ and the pinion $l$ meshing therewith have then been turned back as many teeth as the numeral indicates which was presented by said disk in the sum exhibited and recorded. The spring-drums $m'$, being rigid with the said pinions, respectively, and their disks $m^5$ being locked at that time by the arms $n$, the above movement winds the said spring-drums. As soon as this return movement to zero is ended the cam $c$ moves away from the roller $l^3$, the flat rock-shaft L', acted on by its helicoidal spring, removes the pinions $l$ from the corresponding disks $f$ and engages them with the five-toothed wheels $p^2$. The flat springs $p^4$ move away from the wheels $p^2$, leaving them free to rotate. The levers $n$ are released from the studs $m^8$ of the disks $m^5$.

The function of the cams $m$, respectively integral with the ten-toothed pinions $l$, is to free the disks $m^5$ from the corresponding stop-levers $o$. When any one of the said cams has been turned far enough by the action of the appropriate rack-bar on its pinion $l$ to cause the stop-lever $o$ which is in contact therewith to release the stud $m^7$ of the said disk, the latter is thereby freed and will turn under the action of its spring until checked by the contact of the next stud $m^6$ with the said lever, or if the said cam has turned far enough to carry the stud on said lever beyond the lines of travel of both the studs on the said disk the latter will turn through a complete revolution until stopped by the contact of its stud $m^8$ with the lever $n$. This complete revolution also occurs whenever the stud $m^6$, having been caught as above described, is released by the continued action of the said cam on the lever $o$.

In rotating, the segment $m^4$ engages one of the sets of three teeth of the fifteen-toothed wheel $p^3$, causing the latter to turn to the extent of three teeth, and also turning to the extent of one tooth the five-toothed wheel $p^2$, integral with wheel $p^3$. This latter wheel turns the units-pinion $l$, geared therewith, to the extent of one tooth or one unit. When the ten-toothed units-pinion $l$ has made a complete rotation, indicating ten units, it will turn the adjacent pinion, representing tens, to the extent of one tooth. This continues throughout the decimal series in the usual way. When consulted at any time, the aforesaid devices will show the total of all sums registered since the beginning, the mechanism being started at zero.

To bring the totalizing mechanism back to zero after a series of operations—a day's work, for example—the figures shown on the totalizer are read, but without counting thousands. Then, after finding the number which will make one thousand when added to the number already registered, the said first number is registered, whereby all the spring-drums and connected gearing of the mechanism will be brought to zero except only the thousands barrel or drum, which has no spring and may be turned to zero by hand after raising the operating-lever to disengage the pinion $l^0$ from the corresponding five-toothed wheel $p^2$. When the operating-lever $g$ is brought down to its lowest position, and the driving-shaft B begins to rotate, the cam I releases the shutter, which falls and closes the window $b^2$ toward the customer.

A signal-bell $t$ is rung at the end of the operation by a cam T on driving-shaft B, which raises a hammer $t'$ and compresses a spring $t^2$, the hammer falling when the rotation of the said shaft is ended. A wing-regulator $r$ is controlled by a toothed wheel R on driving-shaft B, gearing with a pinion $r'$, which drives a wheel $r^2$, and thereby a worm $r^3$ connected to said regulator.

The general operation of the machine is as follows: Assuming that all the parts of the apparatus are at zero, and that, to begin with, a sum of five hundred and twenty-six francs and seventy centimes has to be registered, the cashier moves the buttons $d$ in their guide grooves or slots until the figure "5" appears at the hundreds-window $b'$, the figure "2" at the tens-window, and so on. There is no possibility of the cashier making a mistake, for he can read on the horizontal line of windows $b'$ the sum named. If the amount is on a bill, the latter is handed over by the customer and inserted in the slot $j^{15}$. The window $b^2$ on the customer's side is at this time closed by the shutter $i^2$, which hides the number "526.70," which have come to the said window. The cashier now raises the lever $g$. The shaft B, having been set free, revolves one-quarter of a rotation, during which movement the cam H brings into operation the device that locks the toothed disks. The cam J works the mechanism whereby the sum is recorded on the web of paper $j^{11}$ and the bill is stamped. The cam I raises the shutter $i^2$, and the customer can see whether the cashier has registered the proper sum. The cam C rocks the flattened shaft $L'$, bringing the ten-toothed pinions $l$ into engagement with the toothed disks $f$; but before this movement begins the cam N has brought the levers $n$ under the studs $m^8$ of the disks $m^5$, and the cam P rocks the shaft $p^5$, so as to make the springs $p^4$ lock the wheels $p^2$. The cashier then lowers the operating-lever $g$ to its first position, that of rest. The shaft B is freed again and turns three-fourths of a rotation, coming also to a position of rest. During this movement the cam H frees the toothed disks $f$, and the cam Q brings the segments $f^2 f^3$ and the toothed disks $l$ back to zero, that is, back to their position of rest; but in being thus brought back to zero the said disks turn the ten-toothed pinions $l$ to the extent of five teeth for the centimes-pinion, of two teeth for the tens-pinion, and so on, making the spring-drums $m'$ show at their upper part the figure "5" for the centimes-drum, the figure "2" for the tens-drum, and so on. The extra drum for thousands has not moved at all, not being in gear with any disk, and still shows zero. As soon as the return to zero has been made the cam C moves away from the rock-shaft $L'$, which is brought back to its first position by a spring. During this movement the ten-toothed pinions $l$ move away from the disks $f$ and come into gear with the five-toothed wheels $p^2$. The cam P sets free the five-toothed wheels $p^2$, and the cam N allows the arms $n$ to be disengaged from the studs $m^8$; but as none of the spring-drums has made a complete rotation the cams $m$, integral with the said spring-drums, still hold the striking-pieces of the bell-crank levers $o$ on one of the spurs $m^6$ or $m^7$ of the said disks $m^5$, locking the latter. Therefore the totalizing mechanism retains the position to which it was brought by the return of the toothed disks $f$ to zero and shows five hundred and twenty-six francs and seventy centimes. The cam I has now set free the shutter, which has moved into position to cover the window $b^2$. The cam K has carried the leaf $j^{11}$ forward, so as to be ready to record a new operation, and just at the moment when the driving-shaft B ceases to turn, the cam T sets free the hammer $t'$, which strikes the bell $t$ and announces that a sum has been cashed. During the entire rotation of the driving-shaft B the wheel R, carried by the said shaft, has been turning the wing-regulator $r$. So the mechanism has returned to rest, the indicator shows zero, the recording devices have printed "526.70" on the paper, and the totalizing devices show the number "526.70." Everything is ready for a new operation.

Assuming that there is now to be shown registered and recorded a second sum of six hundred and seven francs and forty-five centimes everything proceeds as before, excepting the totalizing mechanism. When the lever $g$ reaches its highest position, the sum of six hundred and seven francs and forty-five centimes is recorded on the paper web $j^{11}$. When the said lever $g$ has been lowered, the return to zero of the indicating-disks is made. During this return the centimes-pinion $l$ turns to the extent of five teeth and its spring-drum to the extent of five units. The tens-pinion $l$ turns to the extent of four teeth and its drum to the extent of four tens. This latter drum had turned during the first registering operation to the extent of seven tens, and as it is graduated from "0" to "9" it now presents the figure "1." On the other hand, it has made more than one complete rotation, so the striking-piece $o^3$ has been disengaged from the last spur $m^7$ of the disk $m^5$, which is no longer prevented from turning except by the arm $n$, still presented under the stud $m^8$. The units-pinion $l$ turns to the extent of seven teeth, and its drum $m$, which consequently turns to the extent of seven units, has come back to the figure "3" having been already turned to the extent of six units during the preceding operation. As the said drum has made more than one complete revolution its lever $o$ has become disconnected from the spurs of the corresponding disk $m^5$, which is no longer retained except by the corresponding arm $n$. The tens-pinion has not turned and its drum still shows the figure "2" of the preceding operation. The hundreds-pinion has turned to the extent of six teeth, and as its drum already showed the figure "5" it has returned to the figure "1." As the revolution has been a complete one the arm $o$ has become disconnected from the spurs of the corresponding disk $m^5$, which is no longer retained except by its arm $n$. The register or totalizer now shows "123.15;" but the cam C moves away from the flattened rock-shaft $L'$, which is oscillated forward by its spring. The pinions $l$ move away from the disk $f$ and come into gear with the five-toothed wheels $p^2$, already set free by the springs $p^4$. At this moment the cam N sets free the arms $n$, which are withdrawn by their spring $n^5$, setting free the studs $m^3$ of the disks $m^5$, when those of the said disks corresponding to units, tens, and hundreds which have already been disconnected from the arms $o$ are turned by their spiral springs, but stopped at the end of one rotation by the contact of one of their spurs on each disk with the striking-piece $o^3$ of the corresponding lever $o$. The tens-disk $m^5$ in each rotation carries around with it the three-toothed segment $m^4$, and the said segment during this motion causes the corresponding fifteen-toothed wheel $p^3$ to turn to the extent of three teeth. The units-pinion $l$, in gear with this pinion, is thereby moved forward one tooth, so that its drum shows one unit more, that is to say, the numeral "4" instead of "3." In the same way the complete rotation of the units-disk $m^5$ transmits an advance movement to the tens-pinion $l$ to the extent of one tooth, and thus causes the tens-drum to show the figure "3" instead of "2." Lastly, the complete rotation of the hundreds-disk $m^5$ transmits an advance of one tooth to the extra pinion $l^0$ for thousands, and causes the thousands-drum $m'$ to show the figure "1" instead of "0." As this drum is divided into twenty parts instead of ten parts, it turns only one-twentieth for each thousand. For that purpose its twenty-toothed pinion gears with a five-toothed wheel $p^2$; but on the hub of this wheel $p^2$ is carried a wheel $p^3$ of ten teeth only, operated by a segment $m^4$, which has only two teeth instead of three, Figs. 29 and 30. The shutter has now closed and the bell rung, as in the first operation. The mechanism is ready to be operated a third time.

As shown in Fig. 31, I make use also of an auxiliary safety device applied to the operating-lever, as follows: During the complete raising of the operating-lever $g$ the stud-plate $g^5$ turns one-sixth of a rotation, and during the return downward movement of the said lever the said disk turns another sixth of a rotation. If in the said upward movement of the lever the plate $g^5$ is made to turn only the twelfth of a rotation, that will suffice for the pawl $g^4$ to pass from one pin or stud of the said plate to the next, because the pawl having turned also a twelfth of a rotation in the opposite direction from that of the plate will have been displaced a sixth of a rotation with regard to any point of this plate. Now if we stop here the raising of the lever $g$ the stud $g^4$ will prevent the spring G from turning the stud-plate $g^5$, so that we can bring back the lever $g$ to its lowest position. This movement, by the action of pawl $g^4$, will turn the plate $g^5$ another twelfth of a rotation in the same direction as the first twelfth. We may thus indefinitely turn the stud-plate $g^5$ in the same direction, thereby winding the spring G, with some risk of breaking it. Similarly when the lever $g$ is in its highest position it is possible to make only a twelfth of a turn downward, then returning to said position, and so on. To guard against the risk of breaking the spring by such movements, I employ mechanism which prevents the ascending lever $g$ from coming back before arriving at its highest position. The same mechanism acts in the same way during the movement of descent. This safety mechanism comprises a sector $g^9$, attached to the arms $g^2$ and $g^7$ of the three-armed lever on the shaft of the operating-lever $g$. The sector $g^9$ bears four notches, of which two, $g^{10}$, are turned in one direction, the others, $g^{11}$, in the reverse direction.

The plate B′, keyed on shaft B, presents two cams $g^{12}$ $g^{13}$, one projecting at the front of said plate, the other on its circumference. The cam $g^{12}$ performs the function of a stop for the double lever B², Fig. 4. On a small fixed horizontal shaft $g^{14}$ there are mounted loosely two superposed levers, having branches $g^{15}$ $g^{16}$. The long arms of these levers present reversely-beveled faces, which tend to bear on the periphery of the sector $g^9$ under the influence of spring $g^{17}$, attached to the short arm of each lever. The short arms of these levers are provided with terminal rollers, one of which is placed opposite the cam-groove of the plate B′, the other slightly in advance of that plate. When the operating-lever $g$ is at its lowest position, all is arranged as in Fig. 31. The roller of the upper lever $g^{15}$ is on its cam $g^{12}$, and the roller of the lever $g^{16}$ rests on the periphery of the plate B′. The large arm of $g^{15}$ is raised, so that the sector $g^9$ may turn from left to right. We may then raise the operating-lever, but after a twelfth of a rotation the beveled face of the long arm of the lever $g^{16}$ lodges in the first notch $g^{11}$ and prevents the lever $g$ from reversing its motion. It therefore is not possible for the lever $g$ to do so until it has reached the very end of its upward course. On reaching this the lever $g$ produces a disengagement, and the cam-plate B′ turns with the shaft B one-fourth of a rotation. At this time the cam $g^{12}$ leaves the lever $g^{15}$, and the cam $g^{13}$ begins to raise the roller on the end of the short arm of the lever $g^{16}$. We may then lower the lever $g$, but after a twelfth of a turn the beveled face of the lever $g^{15}$ engages the notch $g^{10}$ and prevents the rising of the lever $g$, as its descent when rising was previously prevented. Thus in either case the said lever must be pushed up or down to the end of its course, which will produce always the disengagement desired and prevent the fracture of the spring.

The disks $f$, constructed as described, and the segments $f^2$, connected thereto, as shown, with sundry other parts, are not claimed herein, being the subject-matter of claims in my pending application, Serial No. 490,298, filed November 7, 1893.

Many of the devices illustrated and described in this specification are also illustrated, described, and claimed exactly or approximately in my earlier application, Serial No. 490,298, aforesaid, filed November 7, 1893, especially the registering, totalizing, and carrying mechanism, also the driving, stopping, and returning mechanism. As to these I claim herein only the special slight improvements named in specific claims appended hereto, the chief improvements embodied in this application relating to the recording and stamping mechanism and to the described means of regulating the operating-lever.

Having thus described my invention, what I claim as new, and desire to secure by Letters Patent, is—

1. The combination of an operating-lever and a three-armed lever carried by the shaft thereof with two pawls pivoted on one of the said arms of the latter lever, a rotatory stud-plate engaged by one or the other of the said pawls according to the upward or downward motion of the said lever, a spring-drum having its spring attached to the said stud-plate so as to be wound thereby, the main driving-shaft of a cash-register, a cam-plate B' carried thereby, means for enabling the two other arms of the three-armed lever to lock and release at the proper time the said cam-plate and main shaft, gearing whereby the latter shaft is driven, and the usual rack-and-pinion mechanism and intervening connections for exhibiting the figures substantially as set forth.

2. In combination with the operating-lever of a cash-register and the driving-shaft and the actuating-spring of the same, a cam-plate carried by the said driving-shaft; a sector provided with notches, and a pair of levers, acted on by the cams of the said plate, having beveled faces adapted to engage with the said notches to prevent the reverse motion of the said operating-lever, whether rising or falling, until the highest or lowest point is reached, substantially as set forth.

3. In a cash register and recorder a device for recording the sums successively cashed and for stamping bills consisting of a shaft, in combination with a frame oscillating thereon, two rolls of paper $j^3$ and $j^4$ arranged respectively for winding and unwinding and mounted in the said frame, a rubber-covered roller $j^5$, segments $f^5$ opposite the latter roller and provided with raised numerals for printing, a driving-shaft B carrying cams $j$ and K and means between cam K and the unwinding-roller $j^4$ for feeding the paper, and mechanism operated by the cam $j$ to coöperate therewith, the said cam $j$ being arranged to act on the said frame and thereby cause the said rubber-covered roller to force the paper against the raised figures on the segments for printing thereon the amount of the payment substantially as set forth.

4. For the purpose of totalizing the sums registered the series of ten-toothed pinions $l$ moving intermittently into gear with the teeth $e'$ of the registering-disks $f$, the spring-drums $m'$ and cams $m$ integral with the said pinions respectively, the longitudinal shaft L on which the said drums, cams and pinions are mounted and the necessary actuating and connecting mechanism for the said mechanism, each set of devices $l\ m\ m'$ being independent of every other substantially as set forth.

5. The bell-crank levers $o$ and the springs $o^2$ acting thereon, in combination with the cams $m$ arranged for contact with the said levers, the disks $m^5$ carrying studs $m^6$ and $m^7$ arranged to engage attachments of the said levers, the drums $m'$ and pinions $l$ arranged in sets with the said cams as described, the shaft L on which the said cams disks and pinions are mounted, the totalizing-disks $f$ and actuating and intermediate devices, the disks $m^5$ being allowed to make in each instance a complete revolution when the spur $m^7$ is set free by the lever $o$ substantially as set forth.

6. In combination with the mechanism for indicating each payment, means for returning the same to its first position, and means for temporarily locking the said indicating mechanism until such return then releasing it for return and finally moving the locking device into loose contact with a part of the indicating mechanism, in order that it may be ready for the next locking operation substantially as set forth.

7. In combination with the mechanism for indicating each payment, a rotary cam provided with three cam-faces, a locking device engaging a part of the said indicating mechanism and intermediate devices whereby the said faces of the cam actuate the said locking device to lock the said indicating mechanism, to release it, and to hold the said device loosely in engagement therewith, not locking the said mechanism, substantially as set forth.

8. In combination with disks $f$ carrying the indicating-segments and provided with peripheral teeth $e^2$, the spring-pressed locking-rollers $h^6$ adapted to engage the said teeth, the rotating cam H provided with the three cam-faces 1 2 and 3, and intervening mechanism actuated by said cam for holding the said rollers successively in the three positions stated substantially as set forth.

In witness whereof I have hereunto set my hand in presence of two witnesses.

HENRY POTTIN.

Witnesses:
 EUGENE WATTRES,
 CLYDE SHROPSHIRE.